(12) United States Patent
Binder

(10) Patent No.: US 7,426,451 B2
(45) Date of Patent: Sep. 16, 2008

(54) HANDHELD SURFACE COORDINATE MEASURING DEVICE

(75) Inventor: Albert Binder, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 11/402,087

(22) Filed: Apr. 10, 2006

(65) Prior Publication Data
US 2006/0259269 A1 Nov. 16, 2006

(30) Foreign Application Priority Data
May 12, 2005 (DE) .................. 10 2005 000 060

(51) Int. Cl.
G01B 5/00 (2006.01)
G01P 21/00 (2006.01)
G05D 1/02 (2006.01)
G05D 3/00 (2006.01)

(52) U.S. Cl. ............... 702/150; 702/94; 702/95; 702/151; 702/152; 702/153; 702/154; 702/155; 700/302; 700/303

(58) Field of Classification Search ........ 702/150, 702/155
See application file for complete search history.

(56) References Cited

U.S. PATENT DOCUMENTS

| | | | | |
|---|---|---|---|---|
| 3,062,075 A | * | 11/1962 | Saha ........................ | 408/103 |
| 4,643,577 A | * | 2/1987 | Roth et al. ................ | 356/498 |
| 5,051,934 A | | 9/1991 | Wiklund | |
| 5,367,782 A | * | 11/1994 | Izumitani .................. | 33/367 |
| 5,621,975 A | * | 4/1997 | Rando ...................... | 33/227 |
| 5,995,765 A | * | 11/1999 | Kaneko et al. ............ | 396/89 |
| 6,202,312 B1 | | 3/2001 | Rando | |
| 6,401,052 B1 | * | 6/2002 | Herb et al. ................ | 702/150 |
| 6,820,343 B2 | * | 11/2004 | Waibel et al. ............. | 33/293 |
| 6,878,954 B2 | * | 4/2005 | Butler et al. ............. | 250/559.3 |

FOREIGN PATENT DOCUMENTS

| | | |
|---|---|---|
| CH | 691330 A5 | 6/2001 |
| DE | 196 43 800 A1 | 5/1998 |

OTHER PUBLICATIONS

The American Heritage Dictionary of the English Language, definition for "between," 2006, Fourth Edition.*

* cited by examiner

*Primary Examiner*—Michael P. Nghiem
*Assistant Examiner*—Cindy H Khuu
(74) *Attorney, Agent, or Firm*—Abelman, Frayne & Schwab

(57) ABSTRACT

A surface coordinate measuring device (1) includes a computing unit (8) arranged in a handheld housing (9), a positioning device (2) for positioning the coordinate measuring device at a surface point (P) on a wall surface (3), a display device (6) for displaying a measurement calculated by the computing unit (8), an electronic distance measuring system (7) for determining a longitudinal distance along a longitudinal measurement direction, and a transverse measuring device for additional determination of a transverse distance along a transverse measurement direction oriented transverse to the longitudinal measurement direction, with the computing unit (8) having a program-controlled algorithm for carrying out the necessary measurements and calculations.

22 Claims, 6 Drawing Sheets

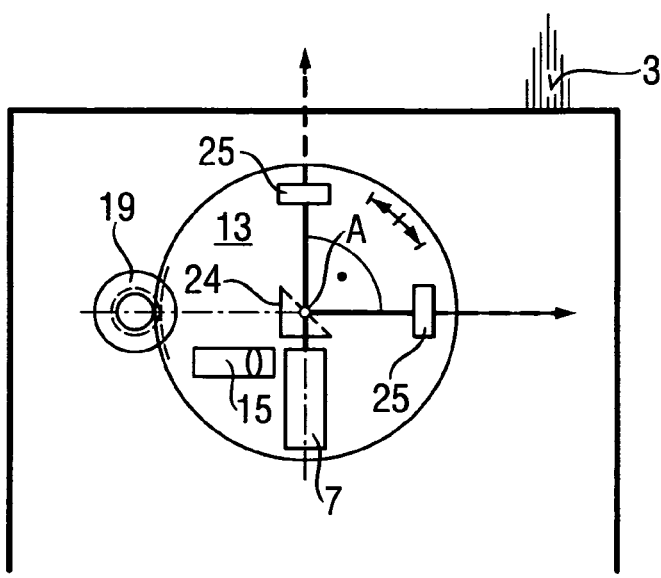
_Fig. 4_
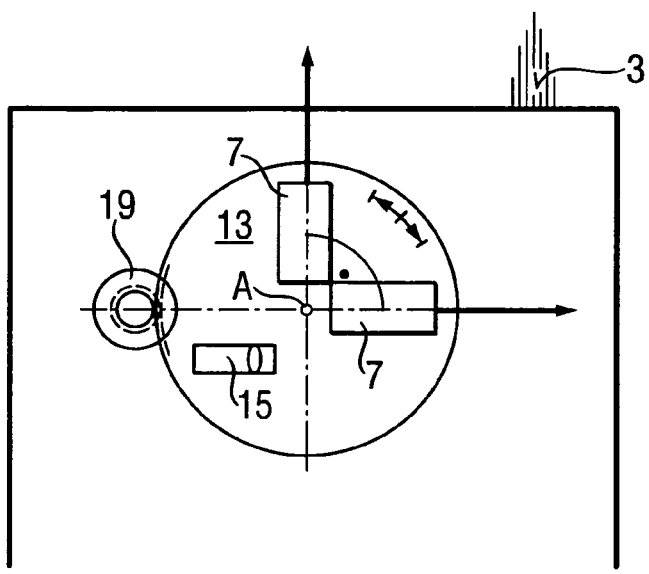
_Fig. 5_
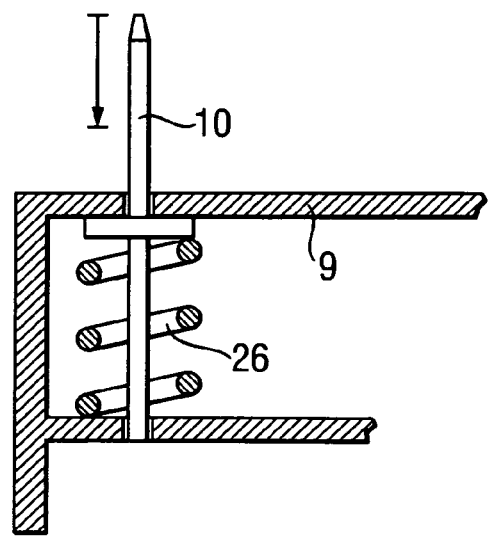
_Fig. 6_

HANDHELD SURFACE COORDINATE MEASURING DEVICE

BACKGROUND OF THE INVENTION

1. Field of the Invention

The present invention relates to a handheld surface coordinate measuring device, preferably for measuring and/or marking coordinates on wall surfaces in the constructional industry, and to an associated measuring method.

2. Description of the Prior Art

With respect to a surface, the coordinates of a spatial point that is generally defined in three dimensions are designated as surface coordinates. Usually, a local Cartesian surface coordinate system, which is defined within the surface, is used for this purpose, preferably with the point of origin at a corner point and at least one coordinate axis along an edge of the surface.

Particularly in the constructional industry, the measurement and marking of surface coordinates on wall surfaces, which includes, within the meaning of the invention, surfaces of side walls, ceilings, floors, etc. that are at least partially planar, play an important role, e.g., for positioning fastening points. In side walls, the inner edges usually extend approximately horizontally or vertically for the most part.

Measuring and/or marking of surface coordinates on wall surfaces is traditionally carried out by using a folding measuring rod successively in one of two directions extending perpendicular to one another for measuring the distance from a virtual intersection to the closest inner edge. Besides the uncertainty of the virtual intersection, the time spent on a twofold measurement is also disadvantageous.

German Publication DE 3839797 discloses an electrooptical distance measuring system for laying out demarcations and which is combined with a horizontal measuring system and a vertical measuring system.

German Publication DE 19643800 discloses a marking device which cooperates with a rotating laser to generate marks for fastening points on a wall surface and which are spaced apart equidistantly along a line. German Publication DE 10034035 discloses a marking device of this kind and which compensates for a positioning error of the housing within a tolerance range.

According to Swiss patent CH 691330, a portable rotating laser is combined with a laser distance measuring system and an angle measuring system so that, in addition to generating virtual planes, the position of a reflecting auxiliary device in three-dimensional space can be determined indirectly within the virtual plane. A rotating laser of this type is not suitable for direct measurement and/or marking of surface coordinates on wall surfaces.

In addition, U.S. Pat. No. 6,202,312 discloses an optical marking device which projects two fanned out laser beams extending perpendicular to one another in a wall surface.

SUMMARY OF THE INVENTION

An object of the invention is a handheld surface coordinate measuring device and an associated measuring method which facilitate the measuring, positioning, or marking of surface coordinates on a wall surface.

This and other objects of the present invention, which will become apparent hereinafter, are achieved by providing a surface coordinate measuring device having an electronic distance measuring system suitable for determining a longitudinal distance along a longitudinal measurement direction, computing means arranged in a handheld housing, a positioning device for positioning the coordinate measuring devices at a surface point on a wall surface, a display device for displaying a measurement calculated by the computing means, and a transverse measuring device for additional determination of a transverse distance along a transverse measurement direction oriented transverse to the longitudinal measurement direction.

Local Cartesian surface coordinates on the wall surface can be determined directly by determining the longitudinal distance and the transverse distance, respectively, to a measurement point. In this connection, the local coordinate point of origin is defined by the diagonal corner point of a measurement rectangle which is formed at the two measurement points and which extends perpendicular to the measurement direction of the longitudinal distance measurement and transverse distance measurement, respectively. In particular, local surface coordinates (X-coordinates, Y-coordinates) can be determined on wall surfaces with inner edges which extend perpendicular to one another at wall surfaces and at which a measurement point is formed in each instance.

The distance measuring system is advantageously formed as a conventional laser distance measuring system, so that distances can be measured with an accuracy of a few mm within the measurement range of several hundreds of meters. In principle, however, a directed ultrasonic measuring system can also be used as a distance measuring system.

In an advantageous manner, the transverse measuring device is (at least with the exception of a few subassemblies that are used in common) a second electronic distance measuring system whose respective measurement directions form a 90-degree angle relative to one another so that two distance measurements can be carried out simultaneously in directions which are perpendicular to one another.

Alternatively, the transverse measuring device is advantageously formed as a switching mechanism which deflects the measurement direction at least at an angle of 90° so that the measurement direction can be discretely deflected transverse thereto in a sequentially controlled manner. Examples of suitable switching mechanisms include a stationary deflecting device (reflecting or refracting) for the measurement beam with an actively controlled pass switch for each measurement direction (longitudinal, transverse), a stationary deflecting device (reflecting or refracting) with a measurement beam-oriented pass switch (frequency-oriented or phase-oriented filter) for each measurement direction (longitudinal, transverse) and an active measurement beam switch, a movable deflecting device which can be switched so as to deflect by at least 90°, etc.

Alternatively, the transverse measuring device is advantageously formed as a swiveling device which swivels the measurement direction in a controlled manner at least by an angle of 90° so that the measurement direction can be deflected (quasi-)continuously in a sequentially controlled manner transverse thereto. Examples of suitable swiveling devices include a controllably swivelable deflecting device (reflecting or refracting) for the measurement beam, an electronic distance measuring system which is swivelable in a controllable manner (at least with the exception of a few stationary subassemblies), etc. The control of the swiveling device can be regulated by an angle control loop with driving means (motor) and an angle sensor or, alternatively, directly by an angle transmitter (stepping motor) which can be triggered (absolutely or incrementally) at defined angles.

In an advantageous manner, at least one level sensor is provided which is sensitive to gravitational acceleration and which enables horizontal or vertical orientation of a measurement direction so that the measurement directions can extend horizontally or vertically. In the simplest case, this is actively monitored by the user by way of the position of the housing placed on the wall surface, this position being detected by the level sensor (bubble level). Since this is usually the case in the constructional industry with regard to inner edges relative to side walls, the local coordinate point of origin is located exactly in the inner corner of the side wall formed by the two inner edges, which is a conventional reference basis for local surface coordinates in the constructional industry.

The level sensor is advantageously connected to the computing means in a regulating manner so that (at least within a permissible angular range, e.g., +/−29°), an automatic leveling of the measurement direction takes place independent from the position of the housing, and the manual positioning can be dispensed with.

The display device advantageously comprises at least a numerical display for an X-coordinate value and a Y-coordinate value so that the surface coordinates of the positioning device can be read off directly.

A placement device (spacer, transparent spacer ring, rubber legs, etc.) is advantageously provided for placing the coordinate measuring device on the wall surface in a securely positioned manner. Advantageously, the placement device has exactly three spacers which are spaced apart over the surface and project out from the housing perpendicular to both measurement directions, so that it is always possible to place the housing at the wall surface without tilting. Further, at least two spacers are advantageously longitudinally displaceable in a springing manner so that unevenness in the wall surface can be compensated.

The positioning device is advantageously formed as a marking contour (hole, corner, cross-slot, etc.) so that the position of the surface point on the wall surface can be exactly marked off by a writing implement (grease pencil, lead pencil, etc.) by being guided along the marking contour.

Storage means for storing at least coordinate values are advantageously associated with the computing means so that the actual measured surface coordinates of the positioning device can be compared with preset, stored, reference coordinates, and differences between them represent a positioning error.

A marking device is advantageously provided to carry out marking at the wall surface. It is further advantageous that the marking device is connected in a controlled manner to the computing means and is suitably formed for compensating positioning errors of the housing within a tolerance range (+/−1 cm). The person skilled in the art is referred to U.S. Pat. No. 6,820,343 for details concerning suitable construction of the marking device, which is not the subject matter of the invention, per se.

A conventional data transmission interface (wireless, IR, etc.) to a computer is advantageously provided and is connected at least to the computing means, so that reference coordinates can be received or measured surface coordinates or marked reference coordinates can be stored for documentation.

A mechanical fastening interface (mounting flange, etc.), for connecting the coordinate measuring device with a suitable handheld power tool (hammer drill, core drilling machine, screwdriving power tool, bolt setting device, etc.) is advantageously provided. Its tool for working the wall surface serves as the marking implement arranged at the positioning device so that the surface coordinates of the work (bore hole, fastening means, setting bolt, etc.) produced at the wall surface by the hand-held power tool can be measured directly.

In the method of measuring the surface coordinates of a surface point on a wall surface with a surface coordinate measuring device having the features mentioned above, the computing means have a program-controlled algorithm which carries out a longitudinal distance measurement relative to a measuring point along a longitudinal measurement direction and a transverse distance measurement relative to a measuring point along a transverse measurement direction in a measurement step and, in a subsequent calculation step, determines local surface coordinates of the positioning point from the two measurement values of the longitudinal distance measurement and the transverse distance measurement.

A sequence of a plurality of individual measurements relative to measurement directions that are offset at different angles is advantageously carried out in the measurement step for the longitudinal distance measurement and transverse distance measurement with the controlled swiveling device, and the longitudinal distances and transverse distances are detected. A minimal longitudinal distance and minimal transverse distance, which are determined from the longitudinal distances and transverse distances, are communicated to the calculation step for determining the surface coordinates, so that the perpendicular distance from an inner edge of the wall surface, which is important in the constructional industry, is used to determine the surface coordinates.

In the measurement step, only a limited quantity of individual measurements is advantageously carried out for the longitudinal measurement direction and transverse measurement direction, respectively, in measurement directions which are offset on both sides at different angles within a narrow angular area (+/−5°) so that the quantity of individual measurements can be reduced.

In the measurement step, the pairs of measurement values (distance, angle) associated with the individual measurements are advantageously detected and stored so that they are available for a subsequent measurement signal processing step for determining the minimum longitudinal distance and minimum transverse distance, and the longitudinal perpendicular angle and transverse perpendicular angle.

The measurement signal processing step advantageously includes a method for approximating (the least square deviation method, etc.) the measurement value pairs at a curve of the distance as a quadratic function of the angle so that the minimal longitudinal distance and the minimal transverse distance and the longitudinal perpendicular angle and the transverse perpendicular angle to an inner edge of the wall surface can be exactly approximated mathematically by means of the summit of the fit parabola.

The calculation step advantageously includes a coordinate transformation step which determines, by using the trigonometric functions, the surface coordinates of the positioning device from the minimum longitudinal distance and minimum transverse distance, the longitudinal perpendicular angle and transverse perpendicular angle and a device-oriented position offset, by which the positioning device is offset relative to the geometric intersection of the longitudinal measurement direction and transverse measurement direction. The positioning device need not be arranged exactly at the intersection of the longitudinal measurement direction and the transverse measurement direction, which is more economical in terms of apparatus because there is usually a subassembly (swiveling device, deflecting device) of the transverse measuring device located at that point.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 4 a schematic view of a detail of a surface coordinate measuring device according to the present invention;

FIG. 5 a schematic view of a detail of a surface coordinate measuring device according to the present invention;

FIG. 6 a schematic view of a detail of a surface coordinate measuring device according to the present invention;

DETAILED DESCRIPTION OF THE PREFERRED EMBODIMENTS

Figure 1:
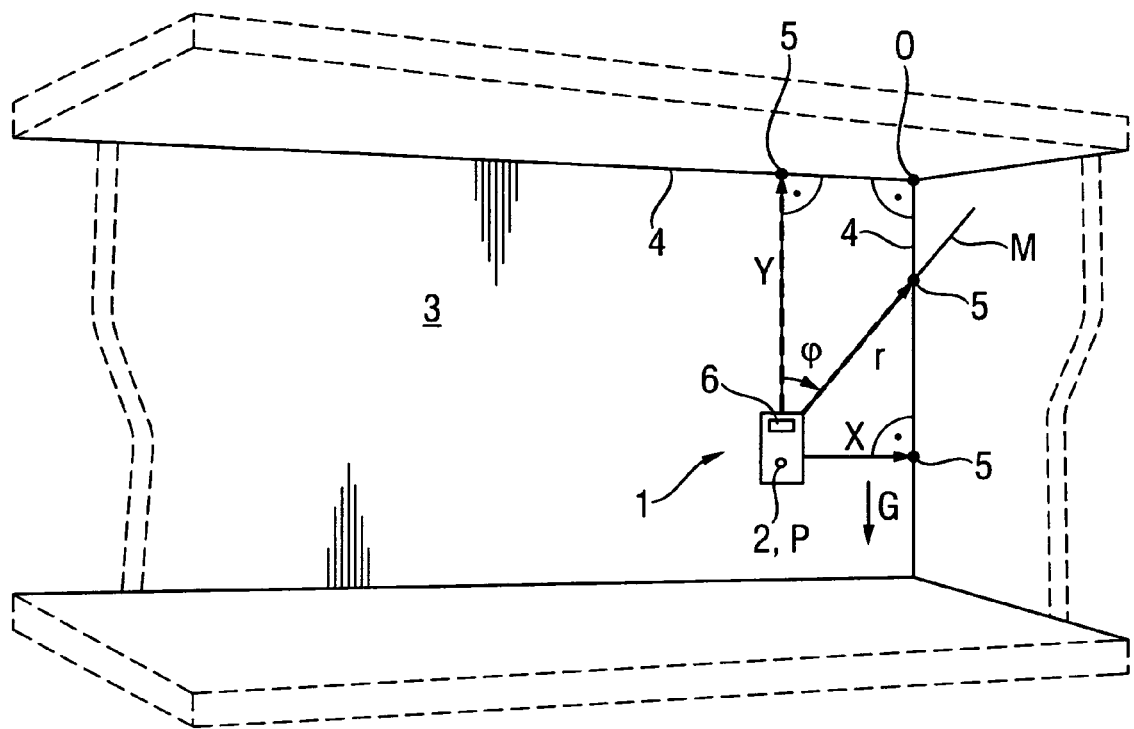
FIG. 1 a schematic view illustrating the principle of surface coordinate measurement.

According to FIG. 1, a surface coordinate measuring device 1 is positioned at a surface point P of a wall surface 3 with inner edges 4 by a positioning device 2. In the accompanying measuring process, the local Cartesian surface coordinates X, Y of the surface point P on the wall surface 3 are determined with a plurality of individual measurements of distances r and angles Φ relative to the measurement point 5 associated with each measurement direction M at an inner edge 4 by a longitudinal distance measurement and transverse distance measurement perpendicular to this measurement point 5. The local coordinate point of origin O is defined by the diagonal corner point of a measurement rectangle which is formed at the two measurement points 5 and which is extended perpendicular to the measurement direction of the longitudinal distance measurement and transverse distance measurement, respectively. The surface coordinates X, Y which are displayed by a display device 6 are defined perpendicular to the inner edges 4 which, as is conventional in the constructional industry, extend horizontally and vertically relative to the gravitational acceleration G.

Figure 2:
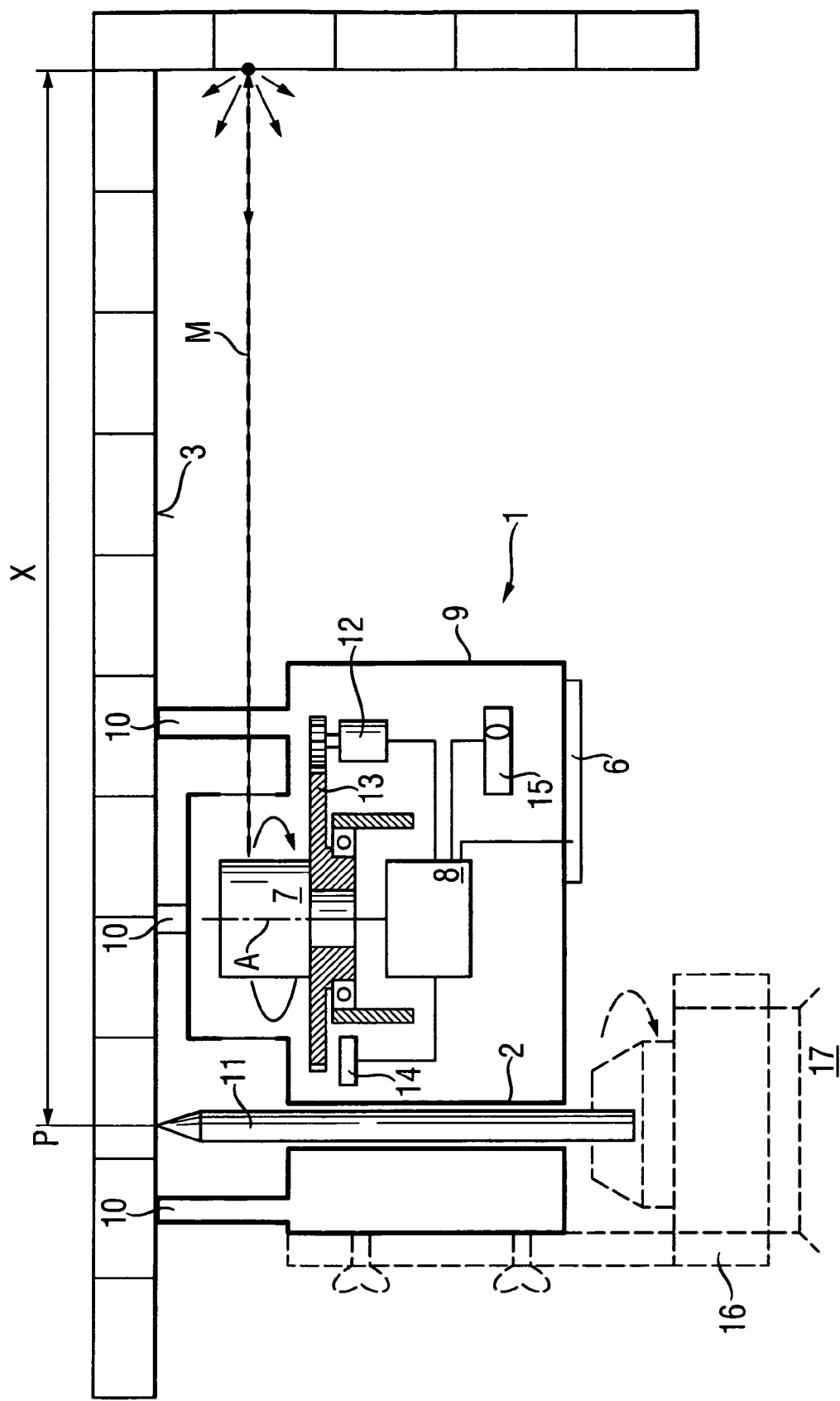
FIG. 2 a schematic view of a surface coordinate measuring device according to the present invention.

According to FIG. 2, the surface coordinate measuring device 1 has an electronic distance measuring system 7 which is suitable for determining a distance r along a measurement direction M and is formed as a conventional laser distance measuring system, computing means 8, and a handheld housing 9. The housing 9 has three spacers 10 as means for placing the housing at the wall surface 3 so as to prevent slipping and in spaced relationship to the wall and parallel thereto. The positioning device 2, which is designed for positioning at the surface point P of the wall surface 3, is formed as a hollow-cylindrical marking contour through which a marking implement 11 in the form of a pencil is guided. The display device 6 is formed as a numerical display for an X-coordinate value and Y-coordinate value determined by the computing means 8. In addition, a transverse measuring device is provided for additionally determining a transverse distance along a transverse measurement direction that is oriented transverse to the longitudinal measurement direction. The transverse measuring device is formed as a swiveling device which is swivelable in a controlled manner in a full circle around an axis A perpendicular to the wall surface 3. The swiveling device is formed as a rotary plate 13 which is driven by an electric motor 12 via a gear arrangement and whose swiveling angle is detected by an angle sensor 14 in the form of an incremental Hall sensor and is regulated in an angle control loop by the computing means 8 and the electric motor 12. Further, the computing means 8 is connected to a level sensor 15 in the form of an electronic bubble level that measures the inclination of the housing 9 with respect to the gravitational acceleration so that an automatic leveling of the measurement direction takes place in a permissible angular range of +/−25°. In addition, an optionally mounted (shown in dash lines) mechanical fastening interface 16, which is formed as a mounting flange, is provided for a suitable handheld power tool 17, e.g., hammer drill. The working tool of the handheld power tool 17, which drills the wall surface 3, serves (in place of the pencil) as the marking implement 11 arranged at the positioning device 2.

Figure 3:
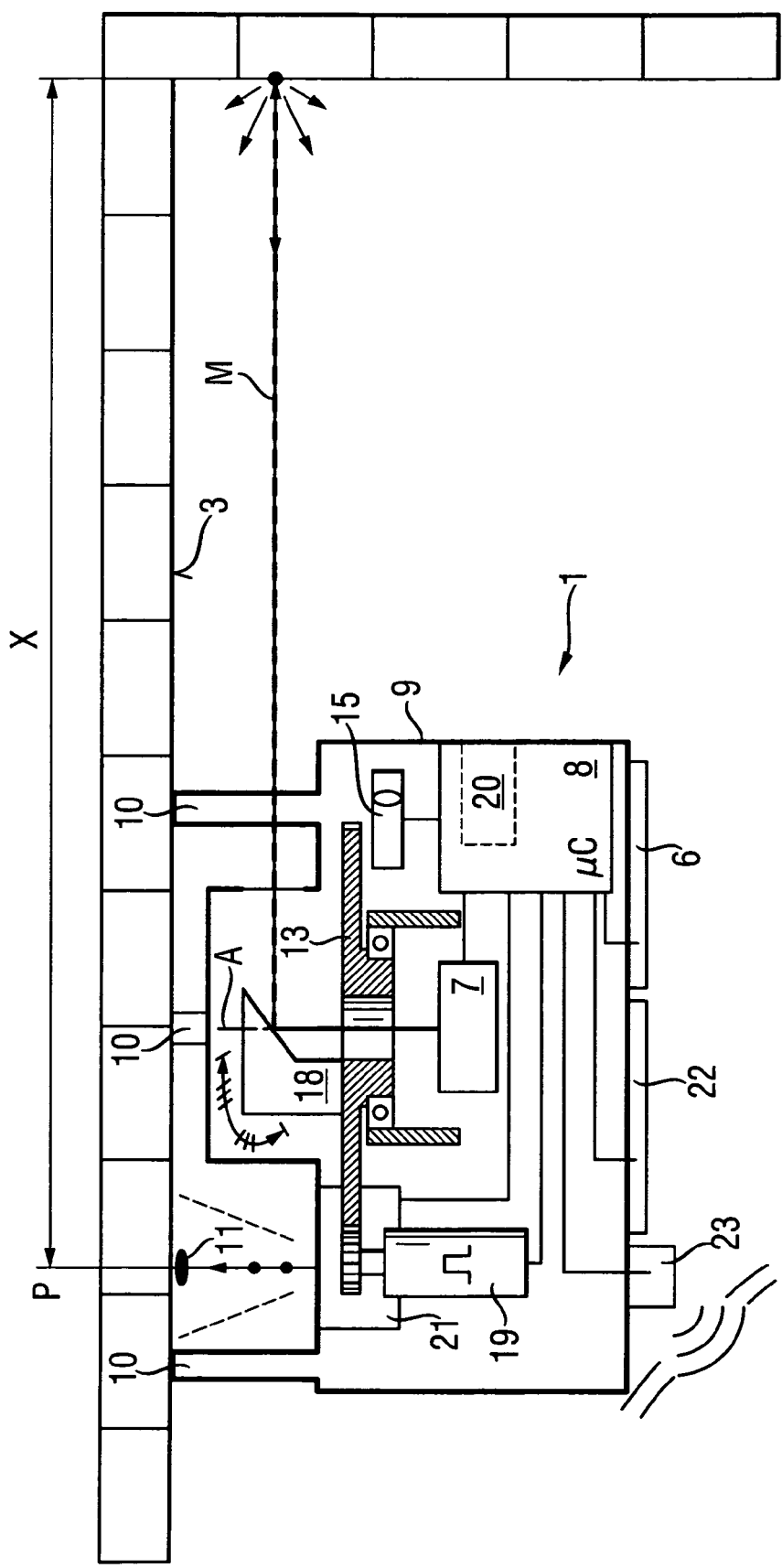
FIG. 3 a schematic view of another embodiment of a surface measuring device according to the present invention.

According to FIG. 3, in contrast to FIG. 2, a surface coordinate measuring device 1 of this kind has a transverse measuring device in the form of a swiveling device which is swivelable in a controlled manner around an axis A perpendicular to the wall surface 3. The swiveling device is formed as a deflecting mirror 18 of the laser distance measuring system 7 which is otherwise arranged in a stationary manner in the housing 9. A plurality of discrete swiveling angles (−5°, 0°, 5°, 85°, 90°, 95°) with reference to a vertical are set directly by the computing means 8 by an incrementally controlled stepping motor 19 which drives the rotary plate 13 via a gear arrangement. Integrated storage means 20 for storing the pairs of individual measurement values, the determined coordinate values and the reference coordinates is associated with the computing means 8 that is formed as a microcontroller μC. A marking device 21 is provided in the form of an inkjet device for marking means 11 in the form of ink droplets which is connected in a controlled manner to the computing means 8 and can compensate for a positioning error of the housing 8 within a tolerance range (+/−1 cm). For further details relating to a marking device 21, a reference is made to U.S. Pat. No. 6,820,343 incorporated herein by reference thereto. Further, input means 22, which is connected to the computing means 8 is provided in the form of a keyboard for entering reference coordinates and the marking command. Also, a conventional bidirectional wireless data transmission interface 23 is provided.

According to FIG. 4, the electronic distance measuring system 7 in the form of a laser distance measuring system is arranged directly on the rotary plate 13 which is swivelable in a controllable manner by +/−25° around an axis A perpendicular to the wall surface 3 by a stepping motor 19. The visible laser beam is split by a beamsplitter 24, which is arranged in the center, into two partial beams which form an angle of 90° relative to one another. Each partial beam is alternately switched by a controlled optical pass switch 25 as a longitudinal measurement direction or transverse measurement direction. In addition, the level sensor 15 in form of an electronic bubble level, which measures the inclination relative to the gravitational acceleration, is likewise arranged on the rotary plate 13.

According to FIG. 5, in contrast to FIG. 4, two electronic distance measuring systems 7, each in the form of a laser distance measuring system whose respective laser beams form an angle of 90° relative to one another, are arranged directly on the controlled swivelable rotary plate 13.

According to FIG. 6, an attachment point 10, which is supported in the housing 9 and which is resiliently pretensioned against pressure by a spring 26, is longitudinally displaceable.

Figure 7:
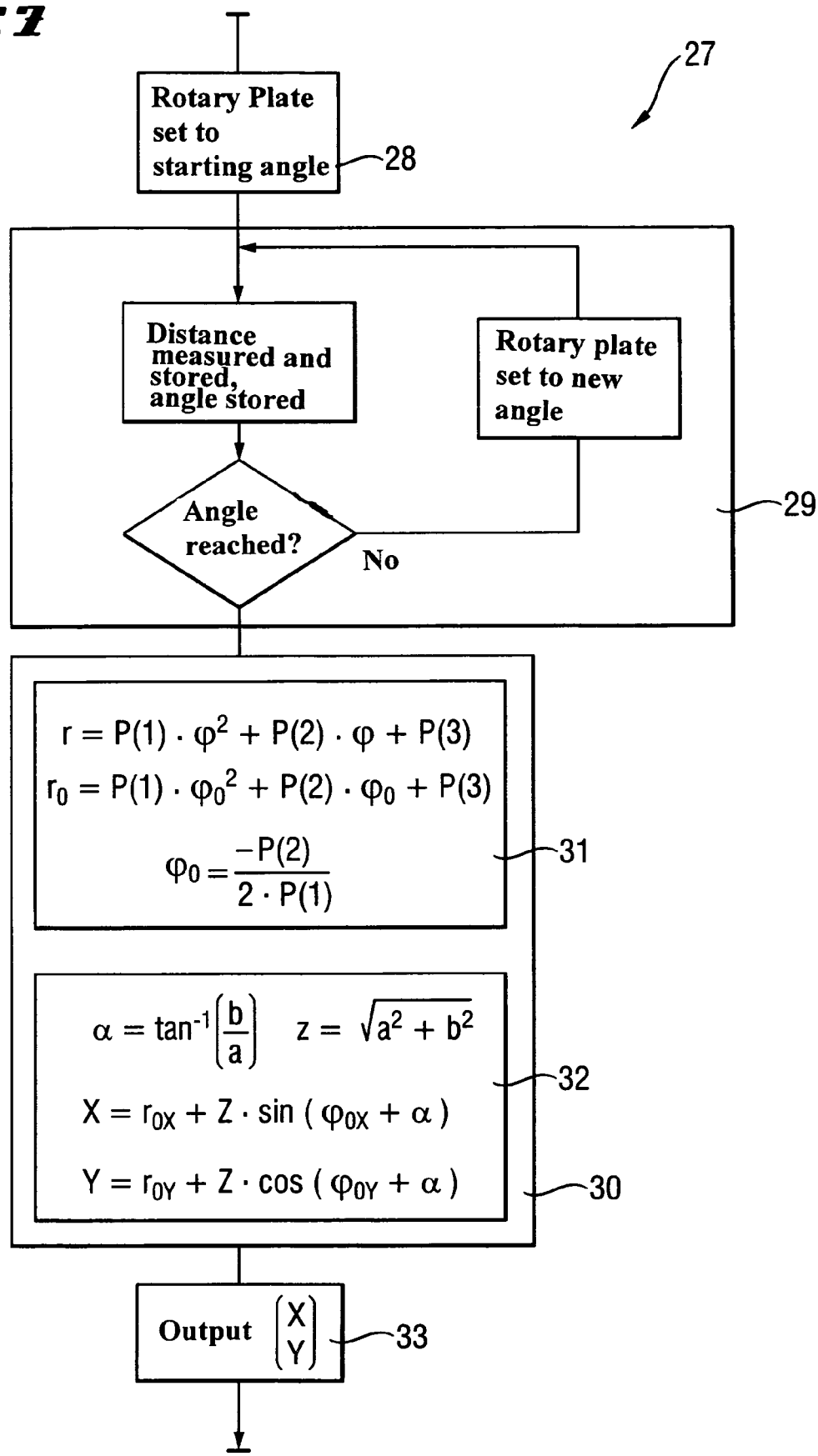
FIG. 7 a flow chart illustrating an algorithm used with a coordinate measuring device.
Figure 8:
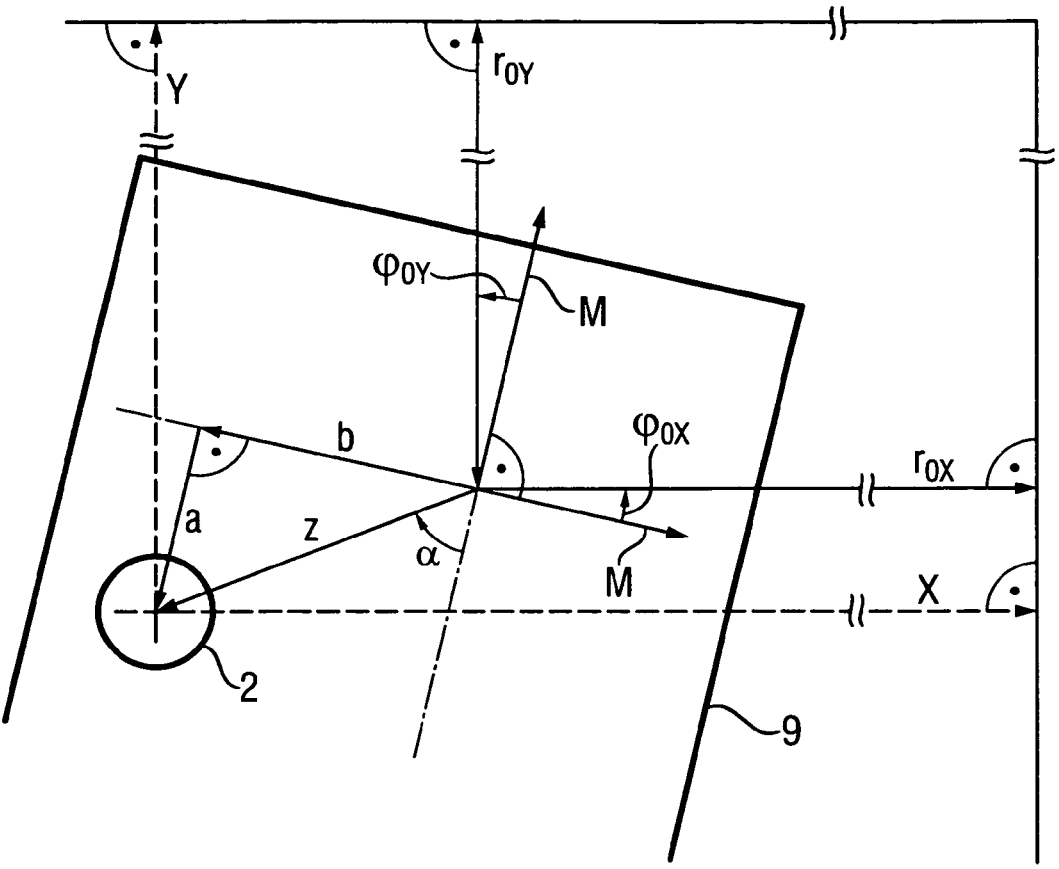
FIG. 8 a schematic view of a calculation model.
Figure 9:
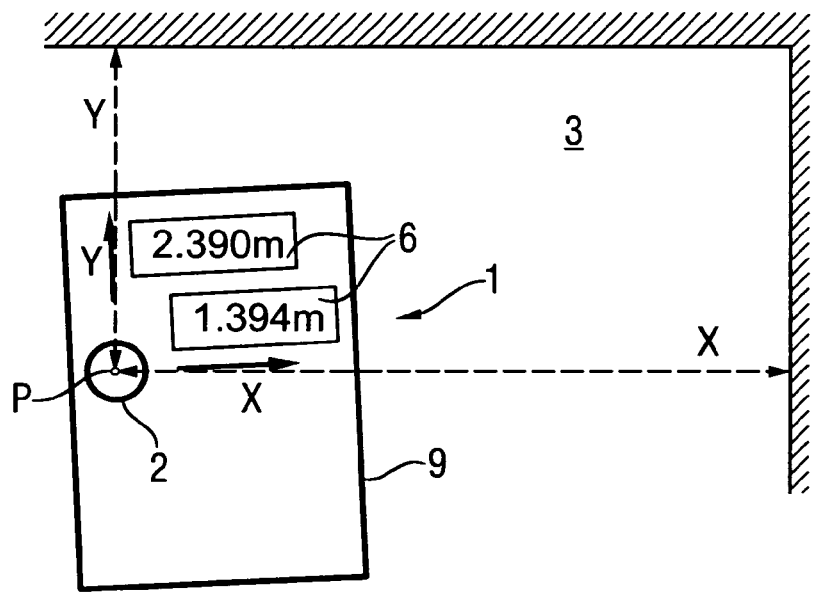
FIG. 9 a schematic view of a display.

According to FIGS. 7, 8 and 9, the algorithm 27 of the measuring method, which is carried out in a modular manner with respect to time in the computing means 8 of the surface coordinate measuring device 1, has a measurement step 29 for measuring the surface coordinates X, Y after an initiation step 28 in which the rotary plate is swiveled to a starting angle that is calculated from a position determined by the level sensor relative to the gravitational acceleration. In this measurement step 29, distances r and angles $\phi$ are measured and stored in three individual measurements for each longitudinal measurement direction and transverse measurement direction for the measurement directions M associated with swiveling angles (−5°, 0°, 5°, 85°, 90°, 95°) which are predetermined by the computing means and in which the rotary plate swivels. In particular, at angle $\phi$, a vertical longitudinal distance measurement is carried out at 0° and a horizontal distance measurement is carried out at 90°. In a further calculation step 30, a local surface coordinate is determined from the individual measurement values of the longitudinal distance measurements and transverse distance measurements. The defined minimum longitudinal distance and minimum transverse distance are used to calculate the surface coordinates X, Y in an internal antecedent measurement signal processing step 31 for each narrow angular range relative to the longitudinal measurement direction and transverse measurement direction. For this purpose, the measurement signal processing step 31 has, for each narrow angular range relative to the longitudinal measurement direction and transverse measurement direction, an approximation of the stored distances r and angles $\phi$ at a curve in the form of a quadratic function of the angle $\phi$ for the distance r. Subsequently, it is possible to exactly calculate the minimum distances $r_0$ and the perpendicular angle $\phi_0$ for each longitudinal measurement direction and transverse measurement direction by means of the three estimated values P(1), P(2), P(3) which are determined using the method of least square deviation. In a subsequent internal coordinate transformation step 32, the surface coordinate X, Y of the positioning device 2 is determined by trigonometric functions from the minimum longitudinal distance $r_{0Y}$ and minimum transverse distance $r_{0X}$, the longitudinal perpendicular angle $\phi_{0Y}$ and transverse perpendicular angle $\phi_{0X}$, and a position offset z of the positioning device 2 relative to the intersection of the measurement directions M, which position offset z is predetermined in a device-oriented manner in the local housing coordinate system with a longitudinal offset a and a width offset b. In a subsequent output step 33, the surface coordinates X, Y are displayed numerically as X-coordinate and Y-coordinate by the display device 6 arranged downstream and are transmitted via wireless data interface.

Though the present invention was shown and described with references to the preferred embodiments, such are merely illustrative of the present invention and are not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A surface coordinate measuring device, comprising:
   a handheld housing (9);
   computing means (8) in the handheld housing (9);
   a positioning device (2) for allowing a user to physically position the surface coordinate measuring device (1) at a surface point (P) on a wall surface (3);
   a display device (6) for displaying a measurement calculated by the computing means (8);
   an electronic distance measuring system (7), including transmitting means and receiving means communicating signals therebetween, for determining a longitudinal distance along a longitudinal measurement direction; and
   transverse measuring means for additional determination of a transverse distance along a transverse measurement direction oriented transverse to the longitudinal measurement direction.

2. A surface coordinate measuring device according to claim 1, wherein the electronic distance measuring system (7) is formed as a laser distance measuring system.

3. A surface coordinate measuring device according to claim 1 wherein the transverse measuring means is a double electronic distance measuring system (7) whose respective measurement directions (M) form a 90-degree angle ($\phi$) relative to one another.

4. A surface coordinate measuring device according to claim 1, wherein the transverse measuring means is a switching mechanism which deflects the measurement direction (M) at least at an angle ($\phi$) of 90°.

5. A surface coordinate measuring device according to claim 1, wherein the transverse measuring means is a swiveling device which swivels the measurement direction (M) in a controlled maimer at least by an angle ($\phi$) of 90°.

6. A surface coordinate measuring device according to claim 1, further comprising at least one level sensor (15) sensitive to a gravitational acceleration and which enables horizontal or vertical orientation of a measurement direction (M).

7. A surface coordinate measuring device according to claim 6, wherein the leveling sensor (15) is connected to the computing means (8) in a regulating manner.

8. A surface coordinate measuring device according to claim 1, wherein the display device (6) comprises at least a numerical display for an X coordinate value and a Y coordinate value.

9. A surface coordinate measuring device according to claim 1, further comprising placement means for placing the coordinate measuring device (1) on the wall surface (3) in a securely positioned manner.

10. A surface coordinate measuring device according to claim 9, wherein the placement means comprises three spacers (10) which are spaced apart over the surface and project out from the housing (9) perpendicular to both longitudinal and transverse measurement directions.

11. A surface coordinate measuring device according to claim 1, wherein the positioning device (2) is formed as a marking contour.

12. A surface coordinate measuring device according to claim 1, comprising storage means (20) for storing at least coordinate values and associated with the computing means (8).

13. A surface coordinate measuring device according to claim 1, comprising a marking device (21) for carrying out marking on the wall surface (3).

14. A coordinate measuring device according to claim 13, wherein the marking device (21) is connected in a controlled manner to the computing means (8) and is capable of compensating a positioning error of the housing (9) within a tolerance range.

15. A surface coordinate measuring device according to claim 1, comprising a data transmission interface (23) connected at least to the computing means (8).

16. A surface coordinate measuring device according to claim 1, further comprising:
a mechanical fastening interface (16) for connecting the surface coordinate measuring device with a handheld power tool (17), with the handheld power tool (17) including a working tool for working the wall surface serving as the marking implement (11) arranged at the positioning device (2).

17. A measurement method of measuring surface coordinates (X, Y) of a surface point (P) on a wall surface (3) with a surface coordinate measuring device (1), the method comprising providing the surface coordinate measuring device including a handheld housing (9); computing means (8) in the handheld housing (9); a positioning device (2) for positioning the coordinate measuring device (1) at a surface point (P) on a wall surface (3); a display device (6) for displaying a measurement calculated by the computing means (8); an electronic distance measuring system (7), including transmitting means and receiving means communicating signals therebetween, for determining a longitudinal distance along a longitudinal measurement direction; and transverse measuring means for additional determination of a transverse distance along a transverse measurement direction oriented transverse to the longitudinal measurement direction, the method further comprising the steps of:
communicating the signals between the transmitting means and the receiving means;
providing the computing means (8) having a program-controlled algorithm (27) which processes the communicated signals and carries out a longitudinal distance measurement relative to a measuring point (P) along the longitudinal measurement direction and the transverse distance measurement relative to a measuring point (5) along the transverse measurement direction in a measurement step (29) and, in a subsequent calculation step (30), determines local surface coordinates (X, Y) of the positioning point (P) from measurement values of the longitudinal distance measurement and the transverse distance measurement.

18. A measuring method according to claim 17, wherein the measurement step (29) comprises carrying out a sequence of a plurality of individual measurements relative to the measurement directions (M) that are offset at different angles for the longitudinal distance measurement and transverse distance measurement with a controlled swiveling device, detecting longitudinal distances and transverse distances, and communicating a minimum longitudinal distance ($r_{0Y}$) and a minimal transverse distance ($r_{0X}$), which are determined from the longitudinal distances and transverse distances, to the calculation step (31) for determining the surface coordinates (X, Y).

19. A measuring method according to claim 18, wherein the measurement step (29) comprises carrying out only a limited quantity of individual measurements for the longitudinal measurement direction and transverse measurement direction, respectively, in measurement directions (M) which are offset on both sides at different angles within a narrow angular range.

20. A measuring method according to claim 18, wherein the measurement step (29) comprises detecting and storing pairs of measurement values associated with the individual measurements which are available for a subsequent measurement signal processing step (31) for determining a minimum distance ($r_0$) and a longitudinal perpendicular angle ($\phi_0$).

21. A measuring method according to claim 20, wherein the measurement signal processing step (31) comprises approximating the pairs of measurement values as a function of the distance (r) which represents a quadratic function of the angle ($\phi$).

22. A measuring method according to claim 18, wherein the calculation step (30) comprises a coordinate transformation step (32) for determining from the minimum longitudinal distance ($r_{0Y}$) and minimum transverse distance ($r_{0X}$), a longitudinal perpendicular angle ($\phi_{0Y}$) and a transverse perpendicular angle ($\phi_{0X}$), and a device-oriented position offset (z), by which the positioning device (2) is offset relative to a geometric intersection of the measurement directions (M), by means of trigonometric functions, the surface coordinates (X,Y) of the positioning device (2).

* * * * *